(No Model.)
R. H. C. VALENTINE.
HAND GRENADE EXTINGUISHER.
No. 350,647. Patented Oct. 12, 1886.
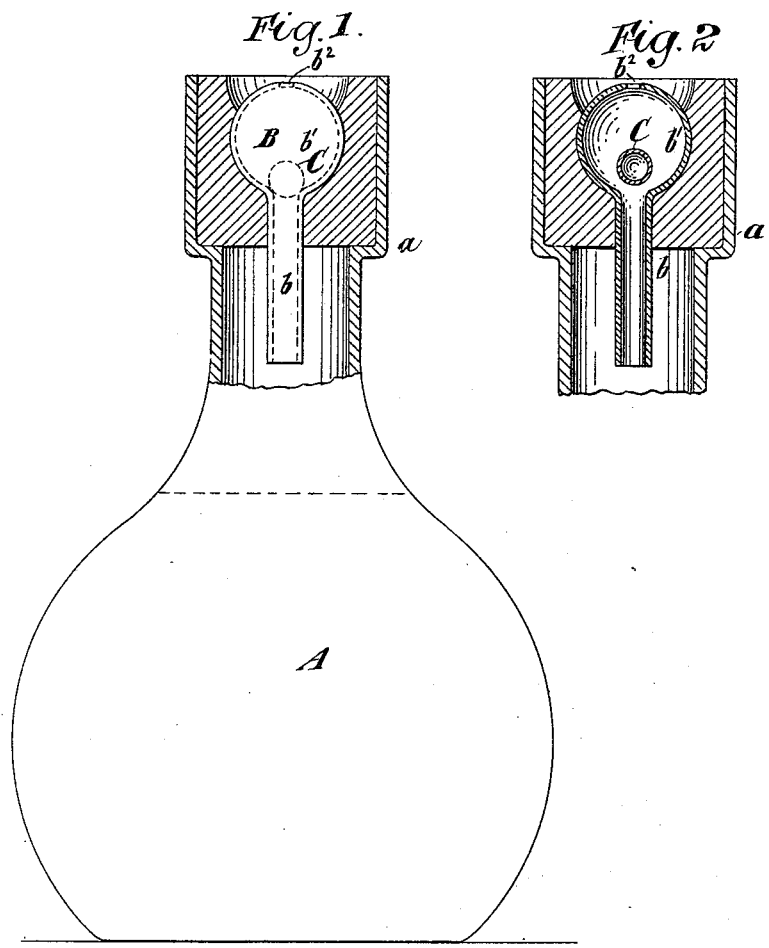
Witnesses
Geo Wadman
James D. Griswold
Inventor
Robert H. C. Valentine
by his attorneys
Gifford & Brown

United States Patent Office.

ROBERT H. C. VALENTINE, OF NEW YORK, N. Y., ASSIGNOR OF ONE-HALF TO ELBRIDGE G. RIDEOUT, OF SAME PLACE.

HAND-GRENADE EXTINGUISHER.

SPECIFICATION forming part of Letters Patent No. 350,647, dated October 12, 1886.

Application filed January 5, 1886. Serial No. 187,652. (No model.)

*To all whom it may concern:*

Be it known that I, ROBERT H. C. VALENTINE, of New York, in the county and State of New York, have invented a certain new and useful Improvement in Fire-Extinguishers, of which the following is a specification.

My improvement relates to fire-extinguishers which consist of frangible vessels—such as glass—containing a fire-extinguishing liquid. It is a common occurrence for the fire-extinguishing agent to generate a pressure within itself that endangers the safety of the vessel containing it, unless some vent for gases generated is provided. The objection to employing an ordinary vent for such a fire-extinguisher vessel is that it affords provision for the entrance of dirt and opportunity for the spilling of the contents of the vessel when the vessel is moved.

It is the object of my improvement to provide a vent which will be simple and inexpensive, and which withal shall not be liable to the objections above enumerated.

My improvement consists in the combination, with a fire-extinguisher vessel made of frangible material and having a shouldered mouth portion, of stopping material in said mouth portion, a glass vent comprising a tubular portion, an externally-spherical portion surmounting said tubular portion and embedded in said stopping material, and a ball-valve arranged in the spherical portion of the vent and normally closing the upper end of the tubular portion. Gaseous pressure generated within the vessel will raise the valve from the seat and escape past it from the upper end of the spherical chamber. After the gases shall have been liberated the ball-valve will roll back and close the vent. If the ball-valve should be shaken from its seat in moving the vessel, it will nevertheless return automatically to its normal position after the vessel is set down again.

In the accompanying drawings, Figure 1 is a vertical section of a fire-extinguisher embodying my improvement. Fig. 2 is a vertical section of the upper part thereof, showing the valve in a different position from that which it occupies in Fig. 1.

Similar letters of reference designate corresponding parts in both figures.

A designates a vessel of frangible material, preferably glass. It is mainly of spherical form, but is slightly flattened at the bottom, so that it may stand in the position it is desired to occupy. At the upper portion it has a mouth and neck, $a$, like a bottle.

B designates a vent, consisting of a lower tubular portion, $b$, which, as shown, is straight, and an upper spherical portion, $b'$, forming a chamber which communicates with the tubular portion $b$, and at the upper end is provided with an opening, $b^2$. In the spherical chamber-like portion $b$ of the vent a valve, C, is arranged.

The vent will preferably be made of glass. The valve C will also preferably be made of glass. It is spherical in form and just large enough to close the opening between the tubular portion $b$ and spherical chamber-like portion $b'$ of the vent.

Any gaseous pressure generated within the vessel can make its escape from the vessel by lifting or rolling the ball-valve C away from its seat and passing by the valve. After the escape of the gas the ball-valve will roll back to its seat, closing the vessel again.

If the vessel should be shaken, as in moving it, and the valve thereby displaced, the valve would return to its position then automatically.

Should it become desirable to pour any of the contents of the vessel upon a fire so small as not to require the whole contents of the vessel for its extinction, this can be done by tilting the vessel, because the valve will then roll out of its seat into another portion of the spherical chamber, and then the contents of the vessel may flow past it. The hole in the top of the spherical chamber should be so small as to preclude the valve from escaping. This vent is arranged in the mouth portion of the bottle, to lessen liability of breaking it when made of glass or like material. It is secured in place by the stopping material employed for closing the mouth of the vessel. This material may be cork, or some plastic compound.

What I claim as my invention, and desire to secure by Letters Patent, is—

The combination, with a fire-extinguishing vessel made of frangible material and having a shouldered mouth portion, of stopping material in said mouth portion, a glass vent comprising a tubular portion, an externally-spherical portion surmounting said tubular portion and embedded in said stopping material, and a ball-valve arranged in the spherical portion of the vent and normally closing the upper end of the tubular portion, substantially as specified.

R. H. C. VALENTINE.

Witnesses:
DANIEL H. DRISCOLL,
JAS. R. BOWEN.